United States Patent Office 3,442,689
Patented May 6, 1969

3,442,689
METHOD OF PLASTICIZING RUBBER FILMS
Robert M. Nelson, Arlington, Gordon E. Gott, Wayland, and John J. Lynch, Arlington, Mass., assignors to W. R. Grace & Co., Cambridge, Mass., a corporation of Connecticut
No Drawing. Filed Sept. 27, 1965, Ser. No. 490,696
Int. Cl. B05b *13/06;* B05c *3/04, 3/05*
U.S. Cl. 117—94                                            13 Claims

ABSTRACT OF THE DISCLOSURE

Inflatable rubber articles (e.g., neoprene meteorological balloons) are post-plasticized by tumbling the article in its uninflated state in the presence of a predetermined amount of plasticizer (e.g., ethylene glycol monobutyl ether oleate solution) until substantially all of the plasticizer has been absorbed.

---

This invention relates to a method of plasticizing inflatable rubber articles and, more specifically, it relates to a method of post-plasticizing meteorological balloons.

While various types of balloons are employed in weather studies, the mainstay of modern meteorology is the sounding balloon. These balloons are designed to carry aloft a radiosonde, rawinsonde, or other instrument group to determine humidity and temperature at various altitudes and, depending upon the instrument used, to determine wind direction and wind velocity as well. Such balloons are necessarily quite large, ranging between about 2 and 12 feet uninflated length, due to the payload they are required to carry, and during ascent expand to at least three times their launching diameter.

Though meteorological balloons have been made from natural rubber, balloons made from neoprene have shown better performance in most respects. However, at very low ambient temperatures, such as those encountered in the tropopause during nighttime flights, neoprene film tends to freeze so that it becomes stiff and brittle and thus, is incapable of expansion. As a result, the bursting altitude of the balloon is considerably lower during hours of darkness than the bursting altitude achieved by similar balloons during daytime flights. For this reason, it is common practice in modern balloon manufacture to post-plasticize the neoprene envelope of sounding balloons to reduce the brittle point temperature of the film so that better high altitude performance can be obtained during nighttime flights.

In conventional post-plasticizing procedures, a cured balloon after being evacuated is immersed in a bath of plasticizing solution composed of a suitable plasticizer dissolved in a volatile organic liquid. When the requisite amount of plasticizer has been absorbed by the film, the balloon is withdrawn from the bath and drained of excess plasticizer solution. Finally, the balloon is inflated to its flaccid, i.e., unextended, diameter and the residual solvent is removed from the balloon film by suspending the balloon by its neck and air drying at room temperature.

A major disadvantage inherent in the above procedure is the lack of uniformity in plasticizer distribution which results in considerable variation in high altitude performance. Because the balloon must be evacuated to assure complete submersion in the plasticizer solution, the formation of many tight folds and creases in the film is unavoidable. The presence of these folds formed during the evacuation process makes it impossible to obtain uniform absorption of plasticizer throughout the balloon film, especially in the areas that are doubled over and tightly creased. Further, during the subsequent draining and drying steps, the lower section of the balloon is in contact with the plasticizer for a longer period of time than the neck and mid portions of the balloon so that there is a significant variation in plasticizer content in different parts of the film.

According to the present invention, a method of post-plasticizing meteorological balloons is provided wherein the plasticizer may be uniformly distributed throughout the relatively large surface area of the film. Specifically, the present invention provides a method of plasticizing a rubber balloon with a liquid system of a rubber-compatible plasticizer which comprises tumbling a cured balloon in its uninflated state in the presence of a predetermined amount of plasticizer system until substantially all of the plasticizer has been absorbed by the balloon. By liquid system of a rubber-compatible plasticizer is meant that plasticization may be carried out with a liquid plasticizer compound, a plasticizer emulsion or a solution of plasticizer dissolved in a volatile organic liquid which is a non-solvent for the cured rubber. In a preferred embodiment, the method comprises tumbling a cured balloon in its uninflated state in the presence of a predetermined amount of plasticizer solution at room temperature until the solution is uniformly distributed over the balloon surface and continuing tumbling of the balloon in a heated atmosphere until substantially all of the solution has been absorbed by the balloon and residual solvent removed. The plasticizer may be deposited into the interior of a cured rubber balloon or added to the tumbler containing the balloon either before or while tumbling the balloon.

The apparatus used in carrying out the present method may be any standard tumbling equipment having a revolving drum which is adapted to be heated in its interior. Preferably, the apparatus used is equipped with appropriate means to regulate the rate of rotation of the drum so that the speed of the revolving drum can be controlled within certain broad ranges. In general, the drum must revolve fast enough to keep the balloons in continuous tumbling motion without rupturing the film. The exact speed depends upon the size of the balloon and the load added to the drum, and preferably is such that the film surfaces continually slide over each other in a tumbling action in order to ensure rapid and uniform distribution of plasticizer. For present purposes, a speed between about 8 and 40 r.p.m. has been found satisfactory for a drum having a capacity of about six and one-half cubic feet with loads up to about one-half its capacity. Larger tumblers would be required for balloons over 8 feet in length.

Though post-plasticizing according to the present method can be carried out at room temperature, tumbling of the balloons for an hour or more is generally required before the plasticizer has been completely absorbed. Thus, it is preferred to tumble the balloons at room temperature until the plasticizer has been uniformly distributed over the film surface and to continue tumbling in the presence of heat in order to accelerate absorption of the plasticizer and to accelerate volatilization of residual solvent or other liquid vehicle where the plasticizer is employed in the form of an emulsion or solution. The temperature used during the latter part of the tumbling cycle may vary widely. For practical purposes, the atmosphere surrounding the balloons is heated to a temperature sufficient to hasten plasticizer absorption by the rubber film and to remove the liquid vehicle, if used, without volatilizing the plasticizer or impairing the properties of the cured film. In general, temperatures between about 100 and 160° F. have been found satisfactory for the liquid plasticizers, plasticizer emulsions and plasticizer solutions conventionally employed for cured neoprene films.

The meteorological balloons treated according to the present invention may be made from uncompounded vulcanizable synthetic elastomers, such as neoprene, or compounded vulcanizable neoprene or other synthetic rubber films which include pigments, fillers, antioxidants, antiozonants, curing accelerators or other compounding ingredients. Also, it will be appreciated by those skilled in the art that the method of this invention can be used advantageously in post-plasticizing other inflatable rubber articles, such as breathing bags.

The particular plasticizers employed in the present method may be any of the compounds customarily used for post-plasticizing elastomers. Typical of the plasticizers compatible with cured neoprene are dialkyl phthalates, e.g., dibutyl and dioctyl phthalates; dialkyl esters of alkane dicarboxylic acids, e.g., dioctyl adipate and dibutyl sebacate; and alkylene glycol derivatives, e.g., triethylene glycol di(2-ethyl hexoate), dipropylene glycol dibenzoate, and ethylene glycol monobutyl ether oleate.

The amount of plasticizer used is not especially critical and depends upon the efficiency of a certain plasticizer for a certain rubber and the degree of plasticization desired in the finished article as determined by such considerations as tensile strength, modulus, elongation and other properties. For obtaining effective freeze resistance in the manufacture of neoprene balloons, the quantity of plasticizer introduced into the film usually ranges between about 15 and 60 parts by weight per 100 parts by weight of neoprene.

To facilitate absorption of the desired level of plasticizer by sounding balloons or other inflatable articles having a relatively large surface area, it is preferred to use a solution of plasticizer in a volatile organic liquid which has a boiling point below that of the plasticizer and which is a non-solvent for the cured rubber. Among the volatile organic liquids which are commonly used as solvents for the neoprene-compatible plasticizers mentioned above are ethyl alcohol, isopropyl alcohol, acetone, and amyl acetate.

The concentration of plasticizer in emulsion or solution may vary widely and depends in large measure upon the surface area of the article and the plasticizer pick-up desired within a given length of time. For treating conventional sounding balloons, which have an uninflated length ranging between about 2 and 12 feet, the concentration of plasticizer in the liquid vehicle ranges between about 20 and 70% by weight.

The following example is given to illustrate the present invention more fully. All quantities given are in parts by weight unless otherwise specified.

EXAMPLE

For comparing the present method of post-plasticizing cured neoprene balloons with the standard dipping procedure, a batch of conventional sounding balloons was divided into four groups, A–D. The balloons in group A were post-plasticized in a conventional manner by immersion while the other three groups of balloons were post-plasticized according to the present invention.

The balloons employed were prepared in a conventional maner by dipping a coagulant-coated balloon mold in an aqueous neoprene dispersion. After a rubber gel of the desired thickness had formed n the mold, the mold carrying the gel was soaked in water to remove water solubles from the rubber layer. The gel was then stripped from the mold, coated with talc and inflated to about four and one-half times its original diameter before any substantial drying of the gel had taken place. The gel was air dried while inflated, and then cured in an oven maintained at 230° F. for about six hours.

The cured balloons had an uninflated length of 5 feet, a film thickness of about 4 mils and weighed about 500 grams each before post-plasticizing. The cured films contained approximately 85% by weight neoprene with the remaining 15% by weight being composed of a curing agent, a curing accelerator, a stabilizer, an antioxidant and an antiozonant as conventionally used in neoprene compounding.

The balloons in each group were post-plasticized to a level of 55 parts by weight plasticizer per 100 parts by weight neoprene with a plasticizer solution consisting of ethylene glycol monobutyl ether oleate dissolved in isopropyl alcohol. The solutions used to treat the different groups of balloons contained a small amount of an oil-soluble red dye as an inspection aid for determining plasticizer distribution on visual inspection of the plasticized films.

The exact procedures employed for post-plasticizing the balloons in groups A–D were as follows:

(A) The balloons in group A were evacuated and immersed in a bath of ethylene glycol monobutyl ether oleate solution and allowed to dwell in the solution until the balloon films had absorbed about 55 parts by weight of plasticizer. The concentration of ethylene glycol monobutyl ether oleate in solution was approximately 45% by weight.

After the requisite amount of plasticizer had been absorbed by the balloon films, the balloons were withdrawn from the bath, drained of excess solution, inflated to their flaccid diameter and suspended by their necks and air dried at room temperature for about one hour to remove residual solvent from the films.

(B) The balloons in group B were post-plasticized to a level of 55 parts by weight plasticizer per 100 parts by weight neoprene by depositing a measured amount of plasticizer solution directly into the interior of each balloon. The concentration of ethylene glycol monobutyl ether oleate in solution was 30% by weight.

The balloons containing the plasticizer solution were placed in a tumbler (laundry drying machine) equipped with a non-perforated revolving drum and tumbled at room temperature until the solution was evenly distributed over the inner surface of the films. After the solution had been distributed, tumbling of the balloons was continued in the presence of heat until the plasticizer was completely absorbed by the films and the residual solvent removed. The plasticized balloons were then removed from the tumbler and allowed to cool.

The overall tumbling time was about one-half hour with about 15 minutes being required to evenly distribute the plasticizer solution. During the latter part of the tumbling cycle, the temperature of the atmosphere surrounding the balloons was brought up to and maintained at 120° F. the capacity of drum in the laundry machine used was about six and one-half cubic feet and was loaded to about ½ its capacity. The speed of the drum was maintained at about 25 r.p.m. throughout the post-plasticizing procedure.

(C) The balloons in group C were post-plasticized in the same manner as described in group B above except that the balloons were placed in the tumbler, and the requisite amount of plasticizer solution poured over the balloons immediately before tumbling was started.

(D) The balloons in group D were post-plasticized according to the procedure described for the balloons in group B except that the balloons were placed in the tumbler and the requisite amount of plasticizer solution was slowly added to the balloons during the first five minutes of tumbling.

When the four groups of balloons were visually inspected for plasticizer distribution, it was found that the balloon films of group A, post-plasticized by evacuating and immersing, contained streaks of red dye of varying intensities indicating that the balloon films contained very little if any plasticizer in some areas and an uneven distribution of plasticizer in others. In contrast, the balloon films post-plasticized according to the procedures described for groups B, C and D showed a very uniform red color indicating a uniform distribtuion of plasticizer throughout the film. When balloons post-plasticized according to the procedures used in (A) and (B) above were analyzed for total plasticizer pickup, a variation of 10% by weight in plasticizer pickup was found for balloons plasticized according to the method of (A) while only a 2% by weight variation in plasticizer pickup was noted for balloons plasticized according to the tumbler post-plasticizing method of (B).

From the above examples and the results obtained, it is readily apparent that a uniform distribution of plasticizer throughout the relatively large surface area of balloon films can be obtained by tumbling the balloons in the presence of a plasticizer solution. Because the balloons are constantly moving and their surfaces continuously sliding over each other, the plasticizer is evenly distributed over the entire film surface. Further, there are no tight folds or creases to prevent uniform distribution and absorption of plasticizer since evacuation of the balloons before post-plasticizing is unnecessary. In addition to better distribution of plasticizer, total plasticizer pickup is more uniform and the time consumed for the post-plasticizing procedure is considerably less than that required by conventional immersion procedures. Further, less handling is required using the present method with the result that there is less spoilage due to damaging of the thin films.

We claim:

1. A method of plasticizing a rubber meterorological balloon with a liquid system of a rubber-compatible plasticizer which comprises tumbling the balloon in its uninflated state in the presence of a predetermined amount of plasticizer until substantially all of the plasticizer has been absorbed.

2. A method according to claim 1 wherein the plasticizer system consists solely of a liquid plasticizer compound.

3. A method according to claim 1 wherein the plasticizer system consists of an aqueous plasticizer emulsion and the balloon is tumbled until substantially all of the plasticizer has been absorbed and the residual water removed.

4. A method according to claim 1 wherein the plasticizer system consists of a plasticizer dissolved in a volatile organic liquid which is a non-solvent for the cured rubber and the balloon is tumbled until substantially all of the plasticizer has been absorbed and the residual organic liquid removed.

5. A method of plasticizing a rubber meteorological balloon with a liquid system of a rubber-compatible plasticizer which comprises tumbling the balloon in its uninflated state at room temperature in the presence of a predetermined amount of plasticizer until the plasticizer has been evenly distributed over the surface of the balloon and thereafter, tumbling the balloon in a heated atmosphere until substantially all of the plasticizer has been absorbed.

6. A method according to claim 5 wherein the plasticizer system consists solely of a liquid plasticizer compound.

7. A method according to claim 5 wherein the plasticizer system consists of an aqueous emulsion of plasticizer and the balloon is tumbled in said heated atmosphere until substantially of the plasticizer has been absorbed and the residual water removed.

8. A method according to claim 5 wherein the plasticizer system consists of a plasticizer dissolved in a volatile organic liquid which is a non-solvent for the cured rubber and the balloon is tumbled in said heated atmosphere until substantially all of the plasticizer has been absorbed and the residual organic liquid removed.

9. A method according to claim 5 wherein said heated atmosphere is maintained at a temperature between about 100° and 160° F.

10. A method according to claim 9 wherein the balloon is tumbled at a rate of between about 8 and 40 r.p.m.

11. A method according to claim 10 wherein the balloon is composed of neoprene.

12. A method according to claim 11 wherein the amount of plasticizer absorbed is between about 15 and 60 parts by weight as based on 100 parts by weight neoprene.

13. A method according to claim 12 wherein the plasticizer system consists of ethylene glycol monobutyl ether oleate dissolved in isopropyl alcohol.

References Cited

UNITED STATES PATENTS

| | | | |
|---|---|---|---|
| 1,025,324 | 5/1912 | Smith | 117—109 X |
| 1,273,662 | 7/1918 | Petrie | 69—30 X |
| 2,646,370 | 7/1953 | Nelson | 117—63 X |

ALFRED L. LEAVITT, *Primary Examiner.*

C. R. WILSON, *Assistant Examiner.*

U.S. Cl. X.R.

117—109; 264—343